United States Patent
Turner et al.

(10) Patent No.: US 8,209,681 B1
(45) Date of Patent: Jun. 26, 2012

(54) METHOD OF SAMPLING HARDWARE EVENTS IN COMPUTER SYSTEM

(75) Inventors: Yoshio Frank Turner, Redwood City, CA (US); Aravind Menon, Lausanne (CH); Jose Renato Santos, San Jose, CA (US); Gopalakrishnan Janakiraman, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1759 days.

(21) Appl. No.: 11/270,089

(22) Filed: Nov. 8, 2005

(51) Int. Cl.
*G06F 9/455* (2006.01)
*G06F 9/46* (2006.01)
*G06F 21/00* (2006.01)

(52) U.S. Cl. ............... 718/1; 718/108; 711/6

(58) Field of Classification Search .............. 718/1, 104, 718/100, 101, 102, 107, 108; 717/130
See application file for complete search history.

(56) References Cited

U.S. PATENT DOCUMENTS

| | | | |
|---|---|---|---|
| 6,662,358 B1 | 12/2003 | Berry et al. | |
| 6,735,758 B1 | 5/2004 | Berry et al. | |
| 2004/0010785 A1* | 1/2004 | Chauvel et al. | 717/158 |
| 2004/0158589 A1* | 8/2004 | Liang et al. | 707/206 |
| 2004/0194077 A1* | 9/2004 | Bharadwaj et al. | 717/158 |
| 2005/0080965 A1* | 4/2005 | Bennett et al. | 710/200 |
| 2006/0005003 A1* | 1/2006 | Grobman | 713/2 |
| 2006/0236067 A1* | 10/2006 | Attinella et al. | 711/173 |
| 2008/0163254 A1* | 7/2008 | Cota-Robles et al. | 719/318 |

OTHER PUBLICATIONS

Menon et al."Diagnosis Performance Overheads in the Xen Virtual Machine Environment", Jun. 11, 2005, pp. 13-23.*
Eulisse et al. "IgProf profiling tool", Sep. 27, 2004, pp. 655-658.*
Jennifer M. Anderson et al., Continuous Profiling: Where Have All the Cycles Gone?, SRC Technical Note 1997-016a, 1997, Systems Research Center, Palo Alto, CA.
Paul Barham et al., Xen and the Art of Virtualization, Proceedings of the nineteenth ACM symposium on Operating systems principles, 2003, pp. 164-177, ACM Press, New York, NY.
Bryan Clark et al., Xen and the Art of Repeated Research, Proceedings of the FREENIX Track: 2004 USENIX Annual Technical Conference, Jun. 27, 2004, pp. 135-144, The USENIX Association, Berkeley CA.
Aaron J. Goldberg et al., Mtool: An Integrated System for Performance Debugging Shared Memory Multiprocessor Applications, IEEE Transactions on Parallel and Distributed Systems, 1993, 4(1):28-40, IEEE, New York, NY.
Xenoprof—System-wide profiler for Xen VM, Apr. 2005, Hewlett-Packard Development Company, L.P., Palo Alto, CA. <http://xenoprof.sourceforge.net/>.

(Continued)

*Primary Examiner* — Emerson Puente
*Assistant Examiner* — Willy W Huaracha (57) ABSTRACT

According to an embodiment, a method of sampling hardware events in a computer system comprises a first step and iterative performance of second and third steps. In the first step, an initiator virtual machine identifies a profiling event and a count to a virtual machine monitor. The virtual machine monitor iteratively performs the second and third steps. In the second step, the virtual machine monitor programs a hardware event counter with the count for the profiling event. In the third step, upon receiving an interrupt from the hardware event counter, the virtual machine monitor saves a sample that comprises a code-in-execution identifier.

44 Claims, 6 Drawing Sheets

OTHER PUBLICATIONS

Aravind Menon et al., Xenoprof—Performance profiling in Xen: User Guide, Version 1.0, Apr. 8, 2005, Hewlett-Packard Co. Palo Alto, CA.

Aravind Menon et al., Diagnosing Performance Overheads in the Xen Virtual Machine Environment, HP Labs Technical Report HPL-2005-80 May 6, 2005, Hewlett-Packard Development Company, L.P., Palo Alto, CA.

Aravind Menon et al., Xenoprof—Performance profiling in Xen: User Guide, Version 1.1, May 25, 2005, Hewlett-Packard Co. Palo Alto, CA.

Shirley V. Moore, A Comparison of Counting and Sampling Modes of Using Performance Monitoring Hardware, 2002, Knoxville, TN.

Brinkley Sprunt, The Basics of Performance Monitoring Hardware, IEEE Micro, 2002, 22(4):64-71, IEEE Computer Society, New York, NY, Los Alamitos, CA.

Brinkley Sprunt, Pentium 4 Performance Monitoring Features, IEEE Micro, 2002, 22(4):72-82, IEEE Computer Society, New York, NY, Los Alamitos, CA.

Andrew Whitaker et al., Constructing Services with Interposable Virtual Hardware, Mar. 29, 2005, Seattle, WA.

Jose Renato Santos et al. U.S. Appl. No. 11/270,137, filed Nov. 8, 2005.

Gopalakrishnan Janakiraman et al. U.S. Appl. No. 11/270,113, filed Nov. 8, 2005.

* cited by examiner

METHOD OF SAMPLING HARDWARE EVENTS IN COMPUTER SYSTEM

RELATED APPLICATIONS

The application is related to U.S. application Ser. No. 11/270,113, now U.S. Pat. No. 7,788,664 and U.S. application Ser. No. 11/270,137, filed on Nov. 8, 2005, the contents of which are hereby incorporated by reference.

FIELD OF THE INVENTION

The present invention relates to the field of computing. More particularly, the present invention relates to the field of computing where hardware event sampling is performed in a computer system operating one or more virtual machines.

BACKGROUND OF THE INVENTION

Hardware performance counters are processor registers that count performance events such as cache misses, virtual memory translation look-aside buffer misses, and number of executed instructions. Some software profiling tools employ hardware performance counters to sample hardware events associated with code execution in order to characterize software performance. OProfile for Linux is an example of such a software profiling tool. Such software profiling tools operate above or within an operating system that in turn operates directly on computer hardware. To profile a specific event, a hardware performance counter is programmed to generate an interrupt to the operating system upon the hardware performance counter reaching a specified count for the specific event. Upon receiving the interrupt, the interrupt handler of the operating system reads the program counter at the time of the interrupt to determine the software that was executing when the hardware performance counter reached the specified count. Typically, the hardware performance counter is reprogrammed each time it expires, which generates a sequence of samples for the specific event. The sequence of samples provides a statistical distribution for the specific event, which may be used to characterize software that was executing while the samples were taken. This provides insight into the portion of the software that is generating the most instances of the specific event. For example, a particular sequence of samples may track instructions that are executing most often. Multiple hardware events may be simultaneously profiled to improve the characterization of the software. Usually, software profiling tools such as OProfile use a non-maskable interrupt upon reaching the specified count since non-maskable interrupts allow profiling of system software that runs with interrupts disabled. However, a maskable interrupt is sometimes used when profiling software that executes with interrupts enabled.

A virtual machine monitor is a software layer that interposes between one or more operating system instances and computer hardware. Sometimes the virtual machine monitor is referred to as a hypervisor, which is a reference to the virtual machine monitor's privilege level. It is a "hypervisor" because its privilege level exceeds a "supervisor" privilege level of an operating system's kernel mode. Each operating system instance is referred to as a virtual machine, which is capable of running its own applications. The virtual machine monitor allocates processor time and memory space to each virtual machine. For example, consider first and second virtual machines that are operating above a virtual machine monitor. In a first time period, the processor is allocated to the first virtual machine; in a second time period, the processor is allocated to the second virtual machine; in a third time period, the processor is allocated to the first virtual machine again; and so forth. Because a virtual machine that hosts an operating system might not be operating when an interrupt is issued, the operating system hosted by the virtual machine is unable to reliably receive interrupts. This makes profiling tools inoperable in virtual machines.

SUMMARY OF THE INVENTION

The present invention comprises a method of sampling hardware events in a computer system. According to an embodiment, the method comprises a first step and iterative performance of second and third steps. In the first step, an initiator virtual machine identifies a profiling event and a count value to a virtual machine monitor. The virtual machine monitor iteratively performs the second and third steps. In the second step, the virtual machine monitor programs a hardware event counter with the count value for the profiling event. In the third step, upon receiving an interrupt from the hardware event counter, the virtual machine monitor saves a sample that comprises a code-in-execution identifier.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
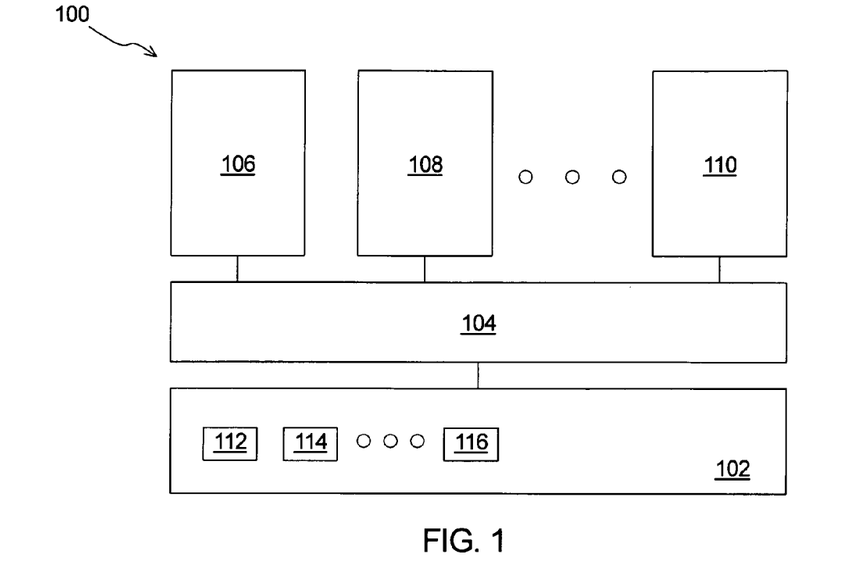
FIG. 1 schematically illustrates a computing system that employs a method a method of sampling hardware events in accordance with an embodiment of the present invention.

An embodiment of a computing system that employs a method of sampling hardware events of the present invention is illustrated schematically in FIG. 1. The computing system 100 comprises computer hardware 102, a virtual machine monitor 104, and first through mth virtual machines, 106 . . . 110. The computer hardware 102 includes a processor (not shown), memory (not shown), and first through nth hardware event counters, 112 . . . 116. The first through mth virtual machines, 106 . . . 110, each include an operating system and an ability to execute one or more applications. The virtual machine monitor 104 allocates processor time and memory space to the first through mth virtual machines, 106 . . . 110, such that each of the first through mth virtual machines, 106 . . . 110, is given an abstracted view that it is an individual computer system executing its own operating system and applications. The first through nth hardware event counters, 112 . . . 116, may count any of a number of event types such as performance events, debug events, error events, or security/violation events. One or more of the first through nth hardware event counters, 112 . . . 116, may be hardware performance counters that count performance events such as executed instructions, clock cycles, cache events, cache hits, cache misses, virtual memory translation look-aside buffer events, virtual memory translation look-aside buffer hits, virtual memory translation look-aside buffer misses, or branch events. More generally, the event type is any event type that may be selected for a processor that is executing code associated with the virtual machine monitor or a virtual machine operating above the virtual machine monitor. Manufacturers of processors include capabilities for monitoring various event types within processors and routinely include additional or other event types in new processors.

Figure 2:
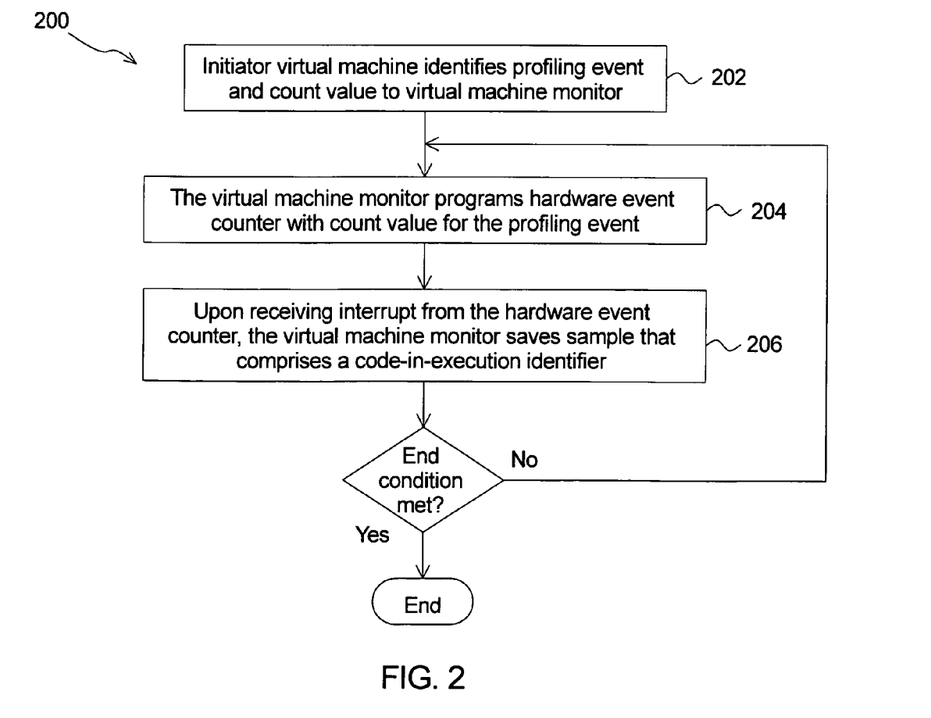
FIG. 2 illustrates an embodiment of a method of sampling hardware events in a computer system of the present invention as a flow chart in which at least one hardware event is sampled.

An embodiment of a method of sampling hardware events in a computer system of the present invention is illustrated as a flow chart in FIG. 2. The method 200 comprises a first step 202 and iterative performance of second and third steps, 204 and 206. In the first step 202, an initiator virtual machine (e.g., the first virtual machine 106 of FIG. 1) identifies a profiling event and a count value to a virtual machine monitor (e.g., the virtual machine monitor 104). The initiator virtual machine may be a sole virtual machine operating above the virtual machine monitor. Or, the initiator virtual machine may be one of a plurality of virtual machines operating above the virtual machine monitor.

In the second step 204, the virtual machine monitor programs a hardware event counter (e.g., the first hardware event counter 112 of FIG. 1) with the count value for the profiling event. The hardware event counter may be a dedicated counter that counts a pre-programmed profiling event. Alternatively, the hardware event counter may be a programmable counter that is programmed with the profiling event to count. If the hardware event counter is a programmable counter, the virtual machine monitor at least initially programs the hardware event counter with an event type for the profiling event.

In the third step 206, upon receiving an interrupt from the hardware event counter, the virtual machine monitor saves a sample that comprises a code-in-execution identifier. The interrupt provides notification to the virtual machine monitor that the count value has been reached. Preferably, the interrupt is a non-maskable interrupt. Alternatively, the interrupt is a maskable interrupt. In an embodiment of the third step 206, the sample further comprises an event identifier. Upon receiving the interrupt from the hardware event counter, an interrupt handling routine may determine a particular counter from a plurality of counters that has reached the count value, which determines the event identifier. The code-in-execution identifier may identify particular code that is executing upon the counter reaching the count or an operating mode or both. The particular code may be identified as a particular software module, a particular function, a group of instructions, or a particular instruction. The operating mode identifier indicates whether the computer system is in a user mode, a kernel mode, or a hypervisor mode when the count value is reached.

The code-in-execution identifier may further include a virtual machine identifier. When multiple virtual machines are sharing hardware, the virtual machine identifier distinguishes the virtual machine currently executing when the count value is reached from others of the multiple virtual machines sharing the hardware.

The second through third steps, 204 . . . 206, of the method 200 continue until interrupted or until reaching an end condition identified by the initiator virtual machine, a recipient virtual machine (discussed below), or a privileged virtual machine that has authority to identify the end condition.

Figure 3:
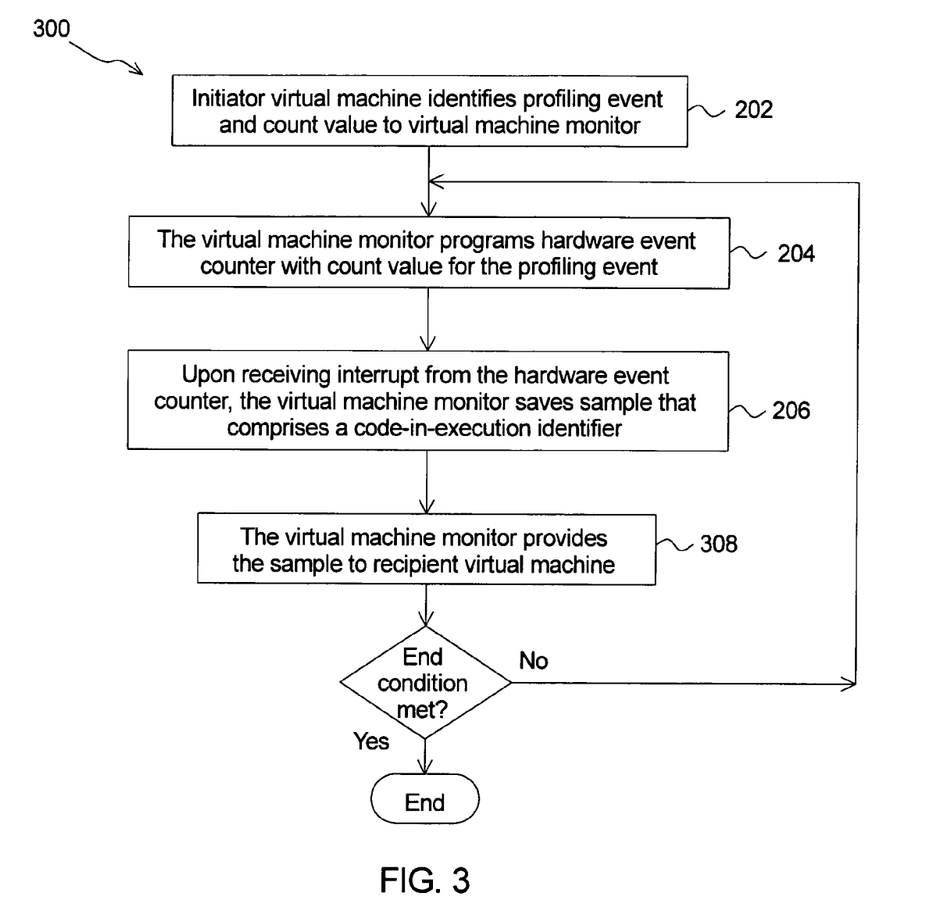
FIG. 3 illustrates an alternative embodiment of a method of sampling hardware events in a computer system of the present invention as a flow chart in which at least one hardware event is sampled.

An alternative embodiment of a method of sampling hardware events in a computer system of the present invention is illustrated as a flow chart in FIG. 3. The method 300 comprises the first through third steps, 202 . . . 206, and a fourth step 308. The virtual machine monitor iteratively performs the second, third, and fourth steps, 204, 206, and 308. The first through third steps, 202 . . . 206, are discussed above relative to the method 200 (FIG. 2).

In the fourth step 308, the virtual machine monitor provides the sample to a recipient virtual machine. The recipient virtual machine may be the initiator virtual machine or another virtual machine. The fourth step 308 may be performed by iteratively performing first and second sub-steps. In the first sub-step, the virtual machine monitor sets a virtual interrupt for the recipient virtual machine upon performing an iteration of the third step 206. A virtual interrupt is a software construct used by the virtual machine monitor to emulate an interrupt for a virtual machine. In the second sub-step, upon receiving the virtual interrupt, the recipient virtual machine accesses the sample.

Figure 4:
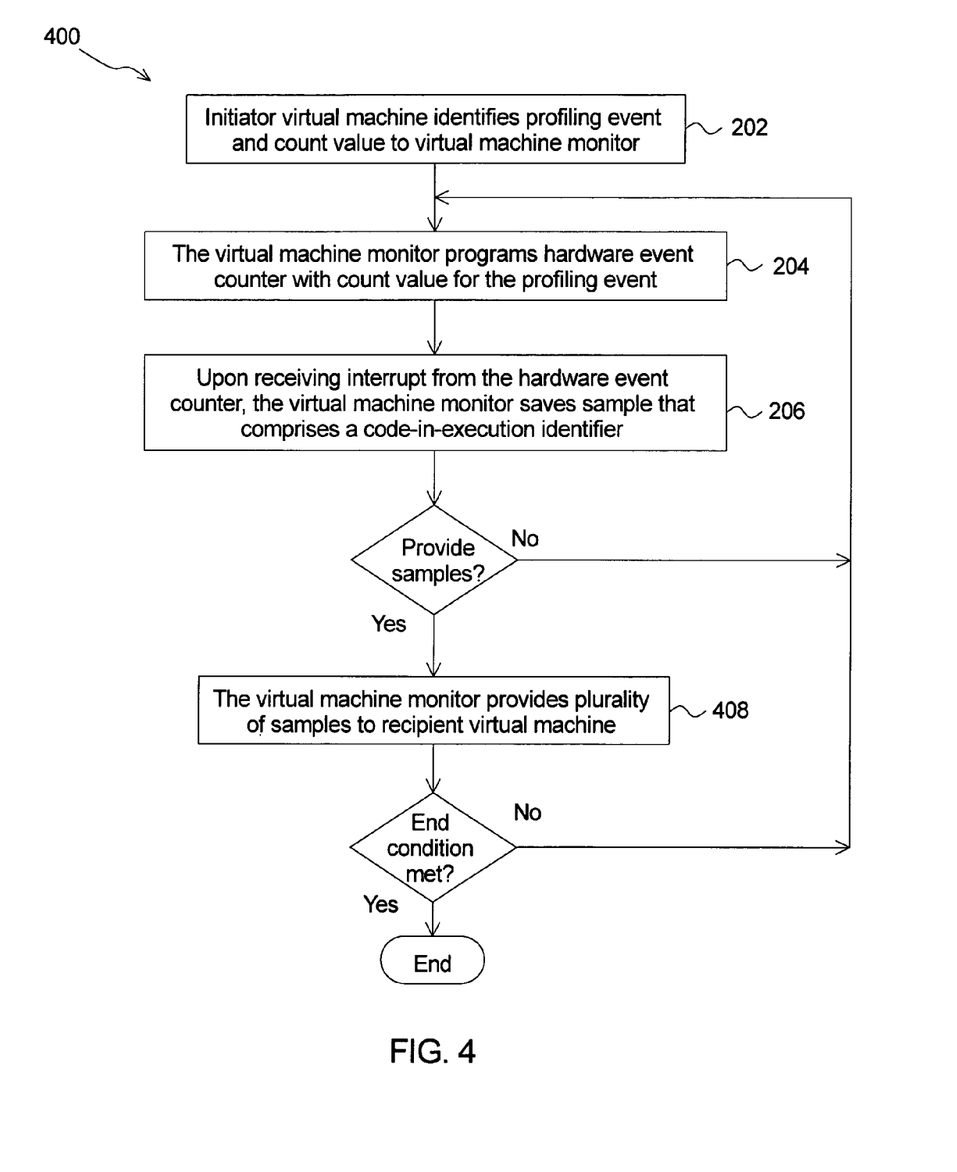
FIG. 4 illustrates another alternative embodiment of a method of sampling hardware events in a computer system of the present invention as a flow chart in which at least one hardware event is sampled.

Another alternative embodiment of a method of sampling hardware events in a computer system of the present invention is illustrated as a flow chart in FIG. 4. The method 400 comprises the first through third steps, 202 . . . 206, and an alternative fourth step 408. The first through third steps, 202 . . . 206, are discussed above relative to the method 200 (FIG. 2).

In the alternative fourth step 408, the virtual machine monitor provides a plurality of samples to a recipient virtual machine after a plurality of iterations of the second and third steps, 204 and 206. The alternative fourth step 408 may be performed in a number of ways. For example, the recipient virtual machine may occasionally query the virtual machine monitor requesting samples that have been saved since a most recent query. Or, for example, the virtual machine monitor may occasionally set a virtual interrupt to notify the recipient virtual machine that a group of samples are available for retrieval (e.g., after collecting a particular number of samples).

In an embodiment, the code-in-execution identifier is a program counter at a time of receipt of the interrupt from the hardware event counter. A program counter is a processor register that identifies the next instruction to be executed by the processor. In this embodiment, an event-associated instruction may be determined by the virtual machine monitor decrementing the program counter. The virtual machine monitor may then save a modified sample including the event identifier and the event-associated instruction in a buffer that is shared with the recipient virtual machine. Eventually, the virtual machine monitor sets a virtual interrupt to notify the recipient virtual machine that one or more samples are available. The recipient virtual machine may flush a series of modified samples to storage, either individually or in one or more groups, for later statistical analysis. Alternatively, the sample saved in the third step 206 may suffice for the statistical analysis of software code, rather than decrementing the program counter and saving the modified sample, since identifying the line of code executing within a few lines of code may provide a sufficiently accurate statistical analysis.

Multiple virtual machines may independently instantiate the method 200, the method 300, or the method 400. If there are sufficient hardware event counters of appropriate type, each instantiation of the method 200, the method 300, or the method 400 may proceed independently.

Alternatively, one or more hardware event counters may be shared by the multiple virtual machines utilizing a method of virtualizing hardware event counters, which is the subject of related U.S. patent application Ser. No. 11/270,113 filed on Nov. 8, 2005.

Figure 5:
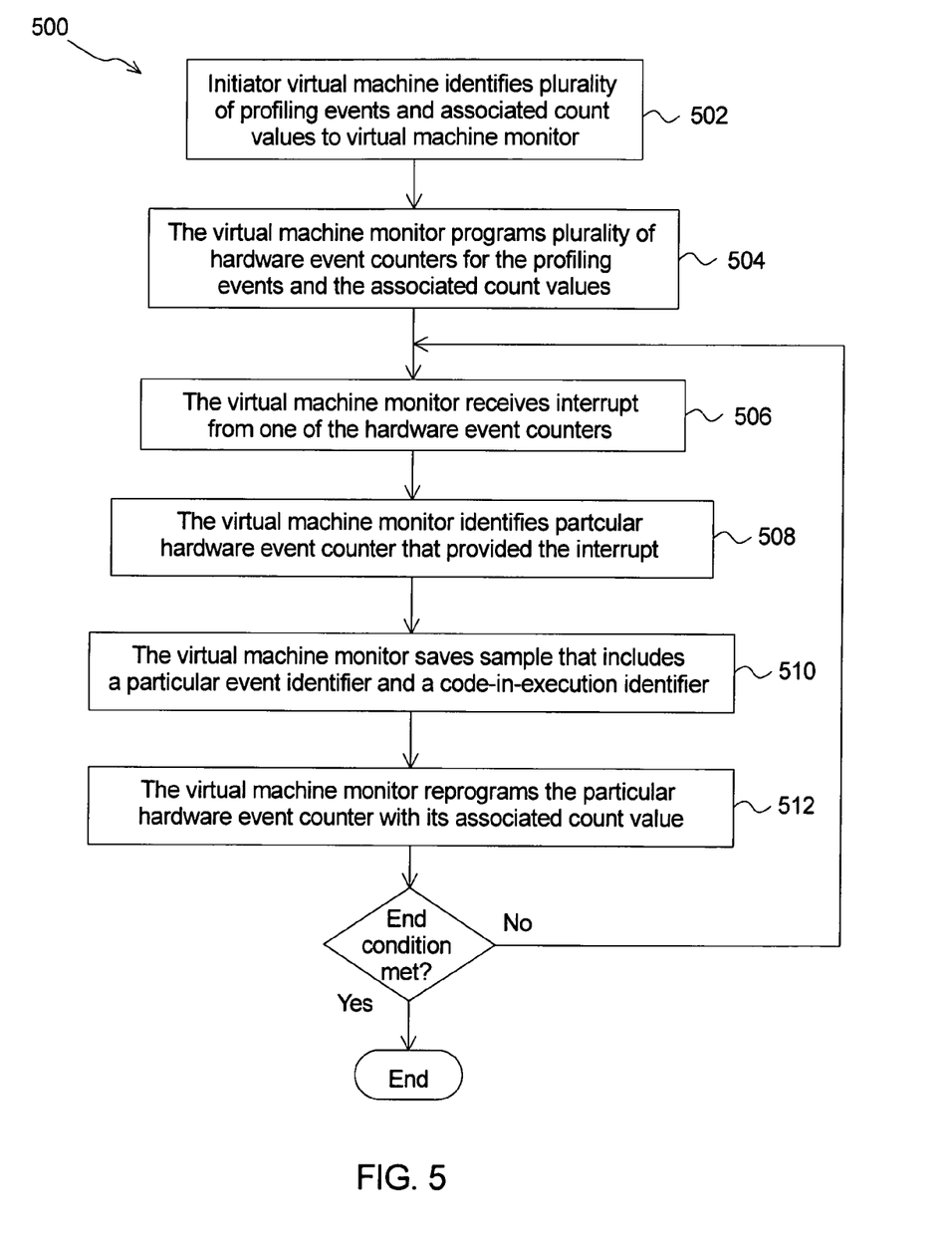
FIG. 5 illustrates an embodiment of a method of sampling hardware events in a computer system of the present invention as a flow chart in which a plurality of hardware events are sampled.

An embodiment of a method of sampling hardware events in a computer system is illustrated as a flow chart in FIG. 5. The method 500 comprises first and second steps, 502 and 504, and iterative performance of third through sixth steps, 506 . . . 512. In the first step 502, an initiator virtual machine identifies a plurality of profiling events and associated count values to a virtual machine monitor. Each profiling event corresponds to a particular count value selected from the associated count values. For example, a first profiling event corresponds to a first associated count value, a second profiling event corresponds to a second associated count value, and so forth.

If an initiator virtual machine identifies a set of virtual machines to a virtual machine monitor for one or more profiling events in the first step 502, an initial instantiation of the second step 504 may be delayed until each of the virtual machines in the set provides a ready status to the virtual machine monitor.

In the second step 504, the virtual machine monitor programs a plurality of hardware event counters for the plurality of profiling events and the associated count values. Each profiling event along with its associated count value is identified to a hardware event counter selected from the plurality of hardware event counters. For example, the virtual machine monitor may identify a first profiling event along with a first count value to a first hardware event counter, a second profiling event along with a second count value to a second hardware event counter, and so forth. Identifying a particular profiling event to a hardware event counter may be accomplished by selecting a hardware event counter that is a dedicated hardware event counter for a particular event type. Alternatively, identifying a particular profiling event to a hardware event counter may be accomplished by selecting a programmable hardware event counter and identifying a particular event type to it.

In the third step 506, the virtual machine monitor receives an interrupt from one of the hardware event counters. For example, if first, second, and third hardware event counters were programmed for first, second, and third profiling events in the second step 504, the interrupt may have come from the first, second, or third hardware event counter. If multiple virtual machines are operating above the virtual machine monitor and a particular virtual machine that is executing at a time of the interrupt is not being profiled by the method 500 (i.e., it is an un-monitored virtual machine), the interrupt may be ignored.

In the fourth step 508, the virtual machine monitor identifies a particular hardware event counter that provided the interrupt. For example, upon receiving the interrupt from the hardware event counter, an interrupt handling routine may determine a particular hardware event counter from the plurality of hardware event counters that has reached the count value, which determines a particular event identifier for a particular profiling event selected from the plurality of profiling event.

In the fifth step 510, the virtual machine monitor saves a sample that includes the particular event identifier and a code-in-execution identifier. The code-in-execution identifier may identify particular software code executing at a time of the interrupt or an operating mode or both. The code-in-execution identifier may also identify the virtual machine executing at a time of the interrupt.

In the sixth step 512, the virtual machine monitor reprograms the particular hardware event counter with its associated count value. For example, if a first hardware event counter reached a first count value leading to an instantiation of the third through fifth steps, 506 . . . 512, the virtual machine monitor reprograms the first hardware event counter with the first count.

The third through sixth steps, 504 . . . 512, of the method 500 continue until interrupted or until reaching an end condition identified by the initiator virtual machine, a recipient virtual machine, or a privileged virtual machine.

Figure 6:
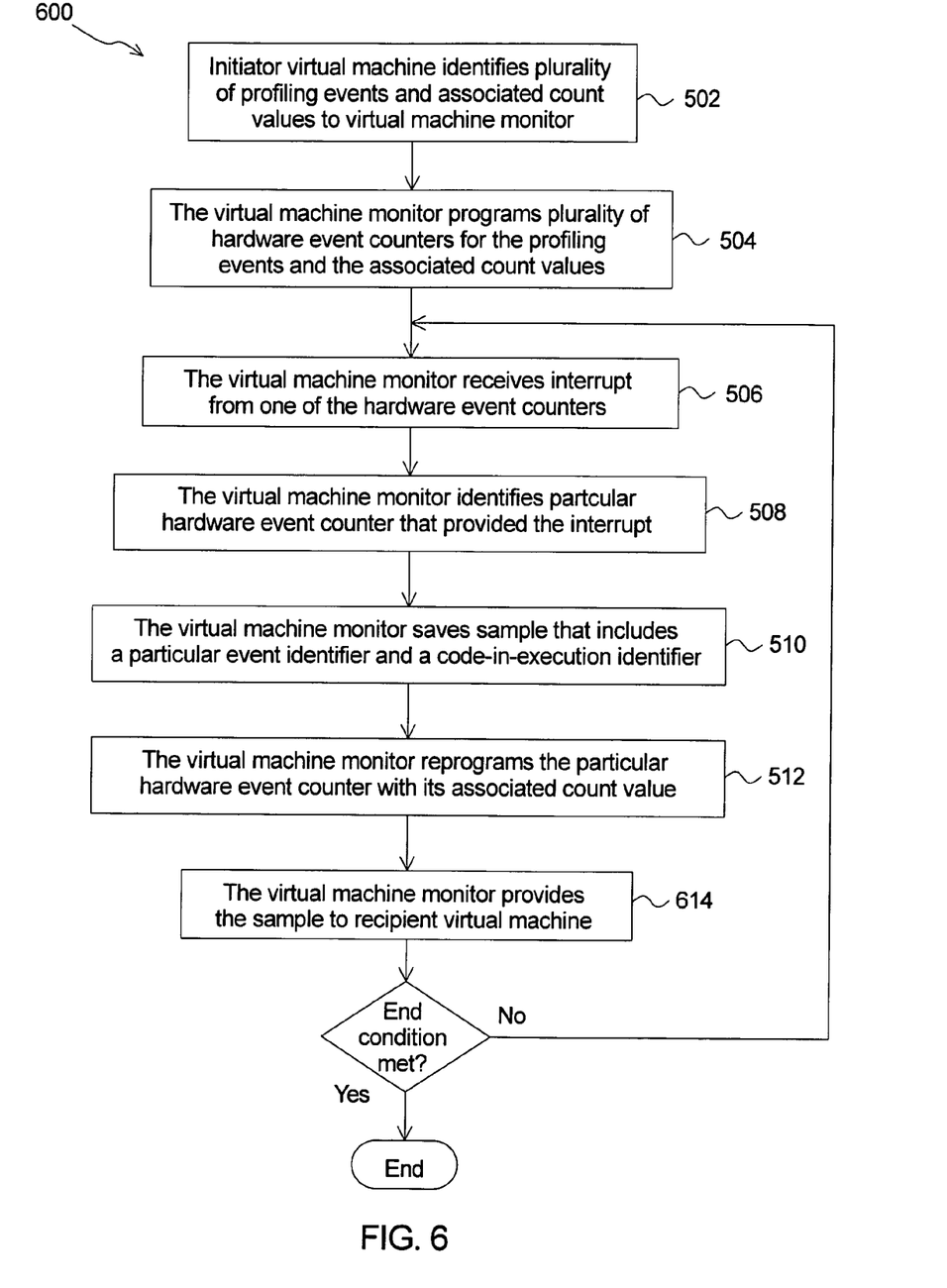
FIG. 6 illustrates an alternative embodiment of a method of sampling hardware events in a computer system of the present invention as a flow chart in which a plurality of hardware events are sampled.

An alternative embodiment of a method of sampling hardware events in a computer system is illustrated as a flow chart in FIG. 6. The method 600 comprises the first through sixth steps, 506 . . . 512, and a seventh step 614. The seventh step 614 is performed iteratively along with the third through sixth steps, 506 . . . 512.

In the seventh step 614, the virtual machine monitor provides one or more samples to a recipient virtual machine. The recipient virtual machine may be the initiator virtual machine or another virtual machine. Preferably, the seventh step 614 is performed by iteratively performing first and second sub-steps. In the first sub-step, the virtual machine monitor sets a virtual interrupt for the recipient virtual machine upon performing an iteration of the sixth step 512. In the second sub-step, upon receiving the virtual interrupt, the recipient virtual machine accesses the sample.

A virtual machine that is allowed to receive the virtual interrupt and the one or more samples is referred to as an "active" virtual machine. In contrast, a "passive" virtual machine refers to a virtual machine that is not allowed to receive notice of samples and is not allowed to access samples. Note that a passive virtual machine may be profiled. If a passive virtual machine is profiled, at least one other virtual machine is designated as a recipient virtual machine for the passive virtual machine's samples. Either a privileged virtual machine or the initiator virtual machine identifies other virtual machines as active or passive. A virtual machine that is neither an active virtual machine nor a passive virtual machine is an un-monitored virtual machine.

For example, consider first through third virtual machines operating above a virtual machine monitor. The first virtual machine acts as the initiator virtual machine and identifies a plurality of profiling events to the virtual machine monitor in the first step 502 of the method 600. At the time of identifying the plurality of profiling events to the virtual machine monitor, the first virtual machine may identify itself and the second virtual machine as active machines as well as identifying the third virtual machine as a passive, virtual machine. The first virtual machine may also identify itself as the recipient virtual machine for samples generated when the third virtual machine is executing. Thus, if the first or third virtual machine is executing when the virtual machine monitor receives the interrupt, the virtual machine monitor provides a resulting sample to the first virtual machine in the seventh step 614. If the second virtual machine is executing when the virtual machine monitor receives the interrupt, the virtual machine monitor provides the resulting sample to the second virtual machine in the seventh step 614.

Figure 7:
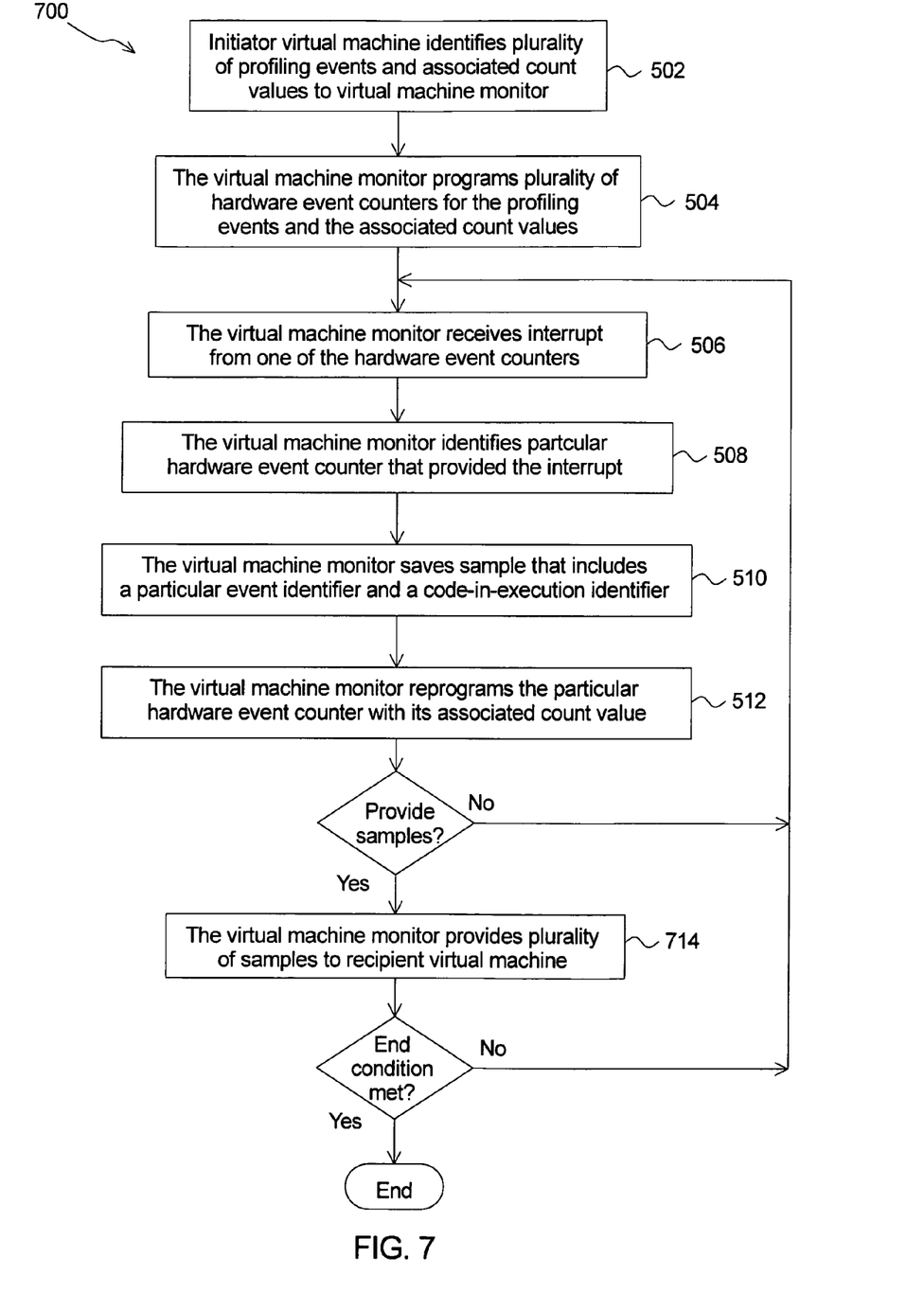
FIG. 7 illustrates another alternative embodiment of a method of sampling hardware events in a computer system of the present invention as a flow chart in which a plurality of hardware events are sampled.

Another alternative embodiment of a method of sampling hardware events in a computer system is illustrated as a flow chart in FIG. 7. The method 700 comprises the first through sixth steps, 502 . . . 512, and an alternative seventh step 714. The alternative seventh step 714 is performed after a number of iterations of the third through sixth steps, 506 . . . 512. The alternative seventh step 714 may be performed in a number of ways. For example, the recipient virtual machine may occasionally query the virtual machine monitor requesting samples that have been saved since a most recent query. Or, for example, the virtual machine monitor may occasionally set a virtual interrupt to notify the recipient virtual machine that a group of samples are available for retrieval (e.g., after collecting a particular number of samples).

Multiple virtual machines may independently instantiate the method 500, the method 600, or the method 700. If there are sufficient hardware event counters of appropriate type, each instantiation of the method 500, the method 600, or the method 700 may proceed independently.

Alternatively, one or more hardware performance counters may be shared utilizing a method of virtualizing hardware performance counters, which is the subject of related U.S. patent application Ser. No. 11/270,113 filed on Nov. 8, 2005.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of sampling hardware events in a computer system comprising the steps of:
    a virtual machine identifying a profiling event and a count value to a virtual machine monitor wherein the virtual machine is an initiator virtual machine; and
    the virtual machine monitor iteratively:
        programming a hardware event counter with the count value for the profiling event;
        upon receiving a non-maskable interrupt from the hardware event counter, saving a sample that comprises an event identifier that identifies the profiling event, a code-in-execution identifier that identifies an operating mode or a particular code that is executing when the count value is reached, and a program counter that identifies a next instruction associated with the profiling event to be executed by a processor;
        determining, by decrementing the program counter, the next instruction of the profiling event;
        saving a modified sample in response to the determination; and
        notifying a recipient virtual machine that the sample and the modified sample are available for retrieval.

2. The method of claim 1 wherein the code-in-execution identifier is selected from an operating mode identifier, a particular code identifier, and a combination thereof.

3. The method of claim 2 wherein the particular code identifier is selected from a particular software module, a particular function, a group of instructions, and a particular instruction.

4. The method of claim 2 wherein the operating mode identifier is selected from a user mode, a kernel mode, and a hypervisor mode.

5. The method of claim 1 wherein the profiling event is selected from performance events, debug events, error events, security/violation events, executed instructions, clock cycles, cache events, cache hits, cache misses, virtual memory translation look-aside buffer events, virtual memory translation look-aside buffer hits, virtual memory translation look-aside buffer misses, and branch events.

6. The method of claim 1 wherein the step of the virtual machine monitor saving the sample saves the sample in a buffer.

7. The method of claim 1 wherein the virtual machine monitor provides a plurality of samples to the recipient virtual machine by providing the plurality of samples to the recipient virtual machine as a series of single samples, the virtual machine monitor providing each single sample upon an iteration of saving the sample upon receiving the non-maskable interrupt from the hardware event counter.

8. The method of claim 1 wherein the virtual machine monitor provides a plurality of samples to the recipient virtual machine by providing the plurality of samples to the recipient virtual machine in one or more groups of samples after a series of iterations of saving the sample upon receiving the non-maskable interrupt from the hardware event counter.

9. The method of claim 1 wherein the recipient virtual machine is the initiator virtual machine.

10. The method of claim 1 wherein the virtual machine monitor provides one or more samples to the recipient virtual machine by setting a virtual interrupt for the recipient virtual machine which notifies the recipient virtual machine to retrieve the one or more samples.

11. The method of claim 1 wherein the virtual machine monitor provides one or more samples to the recipient virtual machine upon receiving a query from the recipient virtual machine.

12. The method of claim 1 further comprising:
    the virtual machine monitor setting a virtual interrupt to notify the recipient virtual machine of a particular sample; and
    the recipient virtual machine receiving the virtual interrupt and accessing the particular sample.

13. The method of claim 12 wherein the code-in-execution identifier comprises a program counter at a time of the virtual machine monitor receiving the interrupt.

14. The method of claim 1 comprising the recipient virtual machine saving the modified sample in a kernel buffer.

15. The method of claim 14 wherein the modified sample comprises an event identifier and a profiling event-associated instruction identifier.

16. The method of claim 14 further comprising the virtual machine flushing the modified sample to storage.

17. The method of claim 16 further comprising the recipient virtual machine performing a statistical analysis upon a series of modified samples.

18. The method of claim 16 further comprising the recipient virtual machine correlating the code-in-execution identifier for the particular sample to particular computer code.

19. The method of claim 18 wherein the particular computer code is selected from a particular software module, a particular function, a particular group of instructions, and a particular instruction.

20. The method of claim 1 wherein the computer system comprises a plurality of virtual machines.

21. The method of claim 20 wherein the sample further comprises a virtual machine identifier that identifies a particular virtual machine executing at a time of the virtual machine monitor receiving the non-maskable interrupt.

22. The method of claim 21 wherein the particular virtual machine is an active virtual machine that is allowed to receive a virtual interrupt from the virtual machine monitor.

23. The method of claim 21 wherein the particular virtual machine is a passive virtual machine that is not allowed to receive a virtual interrupt from the virtual machine monitor.

24. The method of claim 20 further comprising identifying a set of active virtual machines for the profiling event.

25. The method of claim 24 wherein an initial instantiation of the programming of the hardware event counter with the count for the profiling event is delayed until each virtual machine within the set of active virtual machines provides a ready-status to the virtual machine monitor.

26. The method of claim 20 further comprising identifying a set of passive virtual machines for the profiling event.

27. The method of claim 26 further comprising providing one or more samples associated with the passive virtual machines to the recipient virtual machine.

28. The method of claim 20 wherein the recipient virtual machine is the initiator virtual machine.

29. The method of claim 28 further comprising the initiator virtual machine identifying a second profiling event and a second count value to the virtual machine monitor.

30. The method of claim 29 further comprising the virtual machine monitor iteratively:
  programming a second hardware event counter with the second count value for the second profiling event; and
  upon receiving a second interrupt from the second hardware event counter, saving a second sample that comprises a second event identifier and a second code-in-execution identifier.

31. The method of claim 30 further comprising the virtual machine monitor providing a plurality of second samples to the recipient virtual machine.

32. The method of claim 1 further comprising a second virtual machine identifying a second profiling event and a second count value to the virtual machine monitor.

33. The method of claim 32 further comprising the virtual machine monitor iteratively:
  programming a second hardware event counter with the second count value for the second profiling event; and
  upon receiving a second interrupt from the second hardware event counter, saving a second sample that comprises a second code-in-execution identifier.

34. The method of claim 33 further comprising the virtual machine monitor:
  providing one or more samples to the virtual machine; and
  providing one or more second samples to the second virtual machine.

35. The method of claim 32 further comprising the virtual machine monitor virtualizing the hardware event counter such that the hardware event counter counts the profiling event while the virtual machine is executing and further such that the hardware event counter counts the second profiling event while the second virtual machine is executing.

36. A method of sampling hardware events in a computer system comprising the steps of:
  an initiator virtual machine identifying a profiling event and a count value to a virtual machine monitor; and
  the virtual machine monitor iteratively:
    programming a hardware event counter with the count value for the profiling event;
    upon receiving a non-maskable interrupt from the hardware event counter, saving a sample that comprises an event identifier that identifies the profiling event, a code-in-execution identifier that identifies an operating mode or a particular code that is executing when the count value is reached, and a program counter that identifies a next instruction associated with the profiling event to be executed by a processor;
    determining, by decrementing a program counter, the next instruction of the profiling event;
    saving a modified sample in response to the determination;
    notifying a recipient virtual machine that the sample and the modified sample are available for retrieval; and
    providing the sample and the modified sample to the recipient virtual machine.

37. The method of claim 36 wherein the recipient virtual machine is the initiator virtual machine.

38. The method of claim 36 wherein the virtual machine monitor provides the sample to the recipient virtual machine by setting a virtual interrupt for the recipient virtual machine which notifies the recipient virtual machine to retrieve the samples.

39. A method of sampling hardware events in a computer system comprising the steps of:
  an initiator virtual machine identifying a profiling event and a count value to a virtual machine monitor;
  the virtual machine monitor iteratively:
    programming a hardware event counter with the count value for the profiling event; and
    upon receiving a non-maskable interrupt from the hardware event counter, saving a sample that comprises an event identifier that identifies the profiling event, a code-in-execution identifier that identifies an operating mode or a particular code that is executing when the count value is reached, and a program counter that identifies a next instruction associated with the profiling event to be executed by a processor;
    determining, by decrementing a program counter, the next instruction of the profiling event;
    saving a modified sample in response to the determination; and
    the virtual machine monitor notifying a recipient virtual machine when a plurality of samples and a plurality of modified samples are available for retrieval and providing the plurality of samples and the plurality of modified samples to the recipient virtual machine.

40. The method of claim 39 wherein the recipient virtual machine is the initiator virtual machine.

41. The method of claim 39 wherein the virtual machine monitor provides the plurality of samples and the plurality of modified samples to the recipient virtual machine by setting a virtual interrupt for the recipient virtual machine which notifies the recipient virtual machine to retrieve the plurality of samples and the plurality of modified samples.

42. A non-transitory computer readable medium comprising computer code for implementing a method of sampling hardware events in a computer system, the method of sampling hardware events in the computer system comprising the steps of:
  a virtual machine monitor receiving a profiling event and a count value from an initiator virtual machine; and
  the virtual machine monitor iteratively:
    programming a hardware event counter with the count value for the profiling event; and
    upon receiving a non-maskable interrupt from the hardware event counter, saving a sample that comprises an event identifier that identifies the profiling event, a code-in-execution identifier that identifies an operating mode or a particular code that is executing when the count value is reached, and a program counter that identifies a next instruction associated with the profiling event to be executed by a processor;
    determining, by decrementing the program counter, the next instruction of the profiling event;

saving a modified sample in response to the determination;

notifying a recipient virtual machine that the sample and the modified sample are available for retrieval and providing the sample and the modified sample to the recipient virtual machine.

43. A non-transitory computer readable medium comprising computer code for implementing a method of sampling hardware events in a computer system, the method of sampling hardware events in the computer system comprising the steps of:

a virtual machine monitor receiving a profiling event and a count value from an initiator virtual machine; and the virtual machine monitor iteratively:

programming a hardware event counter with the count value for the profiling event;

upon receiving a non-maskable interrupt from the hardware event counter, saving a sample that comprises an event identifier that identifies the profiling event, a code-in-execution identifier that identifies an operating mode or a particular code that is executing when the count value is reached, and a program counter that identifies a next instruction associated with the profiling event to be executed by a processor;

determining, by decrementing the program counter, the next instruction of the profiling event;

saving a modified sample in response to the determination; and notifying a recipient virtual machine when a plurality of samples and a plurality of modified samples are available for retrieval and providing the plurality of samples and the plurality of modified samples to the recipient virtual machine.

44. A non-transitory computer readable medium comprising computer code for implementing a method of sampling hardware events in a computer system, the method of sampling hardware events in the computer system comprising the steps of:

a virtual machine monitor receiving a profiling event and a count value from an initiator virtual machine;

the virtual machine monitor iteratively:

programming a hardware event counter with the count value for the profiling event; and upon receiving a non-maskable interrupt from the hardware event counter, saving a sample that comprises an event identifier that identifies the profiling event, a code-in-execution identifier that identifies an operating mode or a particular code that is executing when the count value is reached, and a program counter that identifies a next instruction associated with the profiling event to be executed by a processor;

determining, by decrementing the program counter, the next instruction of the profiling event;

saving a modified sample in response to the determination; and the virtual machine monitor collecting a predetermined number of samples and modified samples, notifying a recipient virtual machine when the predetermined number of samples and modified samples are available for retrieval, and providing the predetermined number of samples and modified samples to the recipient virtual machine.

* * * * *

UNITED STATES PATENT AND TRADEMARK OFFICE
CERTIFICATE OF CORRECTION

PATENT NO. : 8,209,681 B1
APPLICATION NO. : 11/270089
DATED : June 26, 2012
INVENTOR(S) : Yoshio Frank Turner et al.

It is certified that error appears in the above-identified patent and that said Letters Patent is hereby corrected as shown below:

In the Claims

In column 8, line 42, in Claim 14, delete "comprising" and insert -- further comprising --, therefor.

Signed and Sealed this
Eleventh Day of June, 2013

Teresa Stanek Rea
*Acting Director of the United States Patent and Trademark Office*